United States Patent [19]

Hayase et al.

[11] Patent Number: 4,983,826
[45] Date of Patent: Jan. 8, 1991

[54] ROTATION ANGLE DETECTING APPARATUS

[75] Inventors: Kenji Hayase; Yutaka Iguchi, both of Toyoake; Hidemori Tsuka, Toyota, all of Japan

[73] Assignees: Aisin Seiki Kabushiki Kaisha; Toyota Jidosha Kabushiki Kaisha, both of Aichi, Japan

[21] Appl. No.: 291,823

[22] Filed: Dec. 29, 1988

[30] Foreign Application Priority Data

Dec. 29, 1987 [JP] Japan .................... 62-336077

[51] Int. Cl.$^5$ .............................. G01D 5/34
[52] U.S. Cl. .................. 250/231.18; 341/13
[58] Field of Search ........ 250/231 SE, 237 G, 231.14, 250/231.18; 341/13

[56] References Cited

U.S. PATENT DOCUMENTS

| 4,382,250 | 5/1983 | Radaelli | 341/13 |
| 4,423,322 | 12/1983 | Smith | 250/231 SE |
| 4,741,206 | 5/1988 | Ishigaro | |
| 4,767,164 | 8/1988 | Yeung | 250/231 SE |
| 4,825,070 | 4/1989 | Arimura | 250/231 SE |

Primary Examiner—David C. Nelms
Assistant Examiner—Khaled Shami
Attorney, Agent, or Firm—Sughrue, Mion, Zinn, Macpeak & Seas

[57] ABSTRACT

A rotation angle detecting device, that outputs a position data and a control data, each having a prescribed number of bits, as a serial data. A position-data generating circuit, that includes first detecting circuits, that are turned on or off according to the angle of rotation of a rotary shaft, outputs a position data, having a prescribed number of bits, according to the angle of rotation. A state-data generating circuit, that includes second detecting circuits, that are turned on or off according to the signals from the first detecting circuits, outputs a state data, having a prescribed number of bits, that indicate the states of operation of the first detecting circuits. The state data is transformed to a control data after passing through a data selector and a control code generating circuit. The last bit of the serial data is a parity bit.

8 Claims, 4 Drawing Sheets

ROTATION ANGLE DETECTING APPARATUS

FIELD OF THE INVENTION

The present invention relates to a rotation angle detecting apparatus in rotary optical encoders, and others, used as a sensor for measuring angles of rotation (rotation angles). This type of technology is not limited to rotary optical encoders, but is also widely applied in rotation angle sensors, that perform a switching operation at prescribed angles of rotation. This technology is also applied in devices equipped with a detecting means, that detects an amount of change, encodes this same amount of change, and produces this as output, and a control data generating circuit, that transforms the output data from the same detecting means to a prescribed pattern.

DESCRIPTION OF THE RELATED ART

An example of a type of rotation angle detecting apparatus is described in Japanese Laid-Open Patent Publication No. 59-143903.

This detecting apparatus is used as a car-body height sensor, and comprises a plurality of light-emitting elements provided at prescribed intervals on the side of the car body, a plurality of light-receiving elements provided on the side of the car body, facing the light-emitting elements, and at the same time constituting pairs with these light-emitting elements, and a light-blocking piece, that moves with the upward and downward vibration of the car body, provided between the light-emitting elements and the light-receiving elements. The light-blocking piece has a perforated portion, and a pair, among the plurality of pairs of a light-emitting element and a light-receiving element, undergo optical coupling through this perforated portion. The detecting apparatus also has a voltage level transforming portion. This voltage level transforming portion transforms position signals, obtained from each of the light-emitting elements, to mutually different voltage levels, and selectively outputs these voltage levels to a controlling apparatus, that controls the height of the car body.

The car-body height sensor mentioned above has the advantage that the number of lead wires needed for the voltage level output signals is small. However, since this same car-body height sensor detects the change in the angle of rotation in terms of a change in voltage, and outputs to the controlling apparatus the voltage level signals corresponding to the angle of rotation, the problem of the endurance to noise arises when the voltage levels are low. In other words, the controlling device, that receives the output signals from the car-body height sensor as input, is easily induced to function incorrectly due to the effect of noise. Also, since the differences in the voltages of the output signals become very small as the number of detection levels of the car-body height is increased, the car-body height sensor becomes easily affected by variations in the source voltage, the voltage drop of the output signals, and others.

To solve the problems mentioned above, a viable method is to use a code plate and output code signals corresponding to the angle of rotation of the code plate. However, normally, in this case, a number of lead wires equal to the number of weights for the codes is required. On the other hand, when the number of lead wires is lessened, there arises the need to counteract the effect of noise.

SUMMARY OF THE INVENTION

The object of the present invention is to provide a rotation angle detecting apparatus, that is not easily affected by noise, in which the reliability of operation is improved, and which can be implemented such that only a small number of lead wires is required for the output.

To realize the object mentioned above, the rotation angle detecting apparatus of the present invention comprises:
a rotary shaft,
a position-data generating circuit, that outputs a position data corresponding to the angle of rotation of the rotary shaft, and includes first detecting circuits, that are turned on or off according to the angle of rotation of the rotary shaft,
a state-data generating circuit, that includes second detecting circuits that detect the states of operation of the first detecting circuits, and outputs a state data indicating the states of operation of the first detecting circuits, and
a controlling circuit, that transforms the position data and the state data to a serial data, and outputs this serial data.

Other and further objects of the invention will become obvious upon an understanding of the illustrative embodiments about to be described and indicated in the appended claims, and various advantages not referred to herein will occur to one skilled in the art upon employment of the invention in practice.

DESCRIPTION OF THE PREFERRED EMBODIMENTS

An embodiment of the optical rotation angle detecting apparatus of the present invention, applied in a car-body height sensor, is described with reference to FIG. 1 to FIG. 5.

Figure 2:
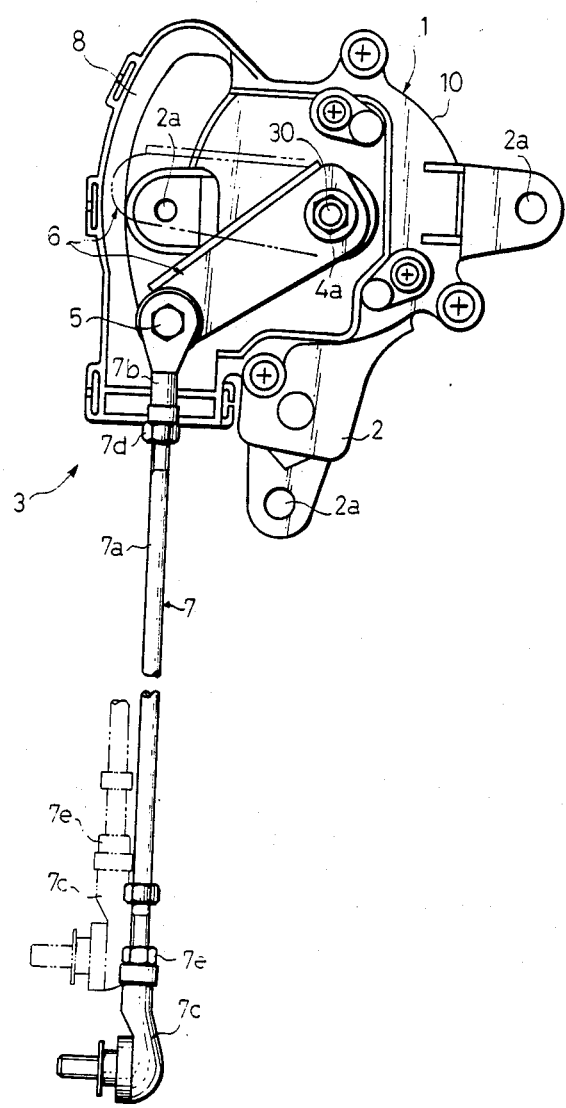
FIG. 2 is a front view showing the car-body height sensor equipped with the optical rotation angle detecting apparatus.

As shown in FIG. 2, a car-body height sensor 1 includes an optical rotation angle detecting apparatus 10, which is installed on the side of the car body by means of bolts (not shown in the figure), and others, through a mounting hole 2a of a bracket 2. One end of an arm piece 6 is fastened to a rotary shaft 30 of the detecting apparatus 10 by means of a bolt 4a, such that the arm piece 6 and the rotary shaft 30 are integrally rotatable. The upper end of a rod piece 7 is fastened by means of a bolt 5 to the other end of the arm piece 6, such that the arm piece 6 and the rod piece 7 are rotatable relative to each other. The lower end of the rod piece 7 is linked to an upper arm or a lower arm below a spring (not shown) of the car. The arm piece 6 and the rod piece 7 make up a linking mechanism 3. The rotary shaft 30 and a part of the linking mechanism 3 are covered by a cover 8. With a change in the height of the car body, the linking mechanism 3, for example, moves from its position, shown by the solid lines, to a position shown by the dotted lines, and the rotary shaft 30 is rotated, causing the electrical output of the detecting apparatus 10 to change.

The length of the rod piece 7 is set by letting a rod body 7a screw into rod-end pieces 7b, 7c, or screw out of the same rod-end pieces 7b, 7c. The length of the rod piece 7 can be locked in place by making locking nuts 7d, 7e, screwed to both ends of the rod piece 7, come in contact with the rod-end pieces 7b, 7c.

Figure 3:
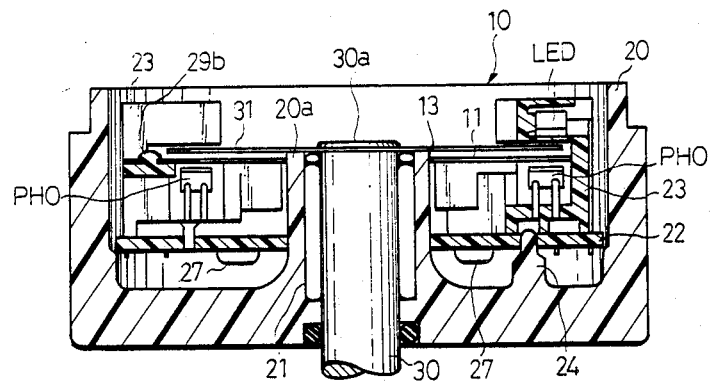
FIG. 3 is a partial cross sectional and plane view showing the optical rotation angle detecting apparatus.
Figure 4:
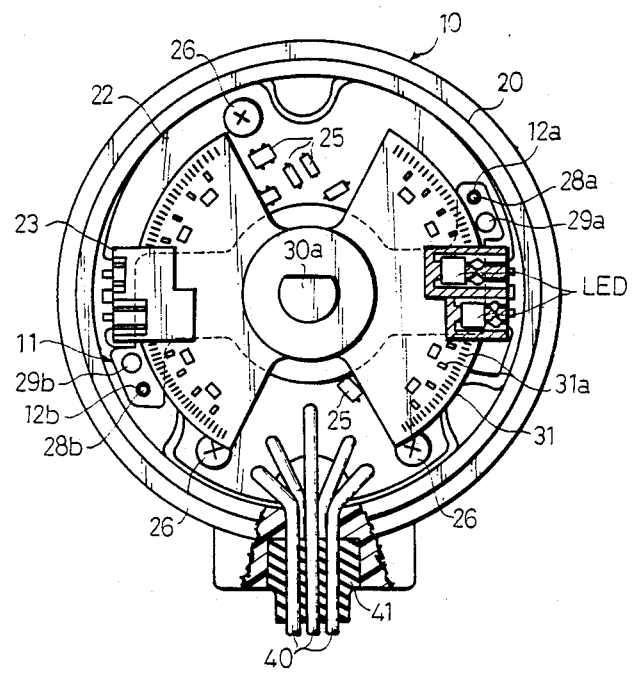
FIG. 4 is a cross sectional view showing the optical rotation angle detecting apparatus.

As shown in FIG. 3, a housing 20 of the detecting apparatus 10 has a protruding portion 20a in the middle. The rotary shaft 30 mentioned above is rotatably installed inside the protruding portion 20a, through a bearing means 21 made of metal, or others. As shown in FIG. 4, a printed circuit board 22, on which electronics parts 25 have been connected, is contained inside the housing 20. A photocoupler base 23 is mounted on the printed circuit board 22 by means of screws 27. There are two photocoupler bases 23 provided facing each other. Each photocoupler base 23 contains two light-emitting diodes LED, as the light-emitting elements, and two photo transistors PHO, as the light-receiving elements, arranged facing the light-emitting diodes LED. In other words, the detecting apparatus 10 of the present embodiment is provided with 4 light-emitting diodes LED (LED1 to LED4) and 4 photo transistors PHO (PHO1 to PHO4). The printed circuit board 22 and the photocoupler bases 23 are set at a fixed position inside the housing 20 by means of a position setting pin 24, a screw 26, and the protruding portion 20a.

A rotary disk 31 is fixed to the front end of the rotary shaft 30 by means of a caulked portion 30a, such that the perimeter portion of the rotary disk 31 is positioned between the light-emitting diodes LED and the photo transistors PHO. A fixed number of slits 31a are formed along the perimeter portion of the rotary disk 31. Between the rotary disk 31 and the photo transistors PHO, a fixed slit-plate 11, that contains slits (not shown), is mounted on the photocoupler bases 23 by means of a fixing means. This fixing means is made up of, for example, mounting guide holes 12a and 12b provided on the fixed slit plate 11, mounting guide protrusions 28a and 28b inserted into the mounting guide holes 12a and 12b and provided on the photocoupler bases 23, and thermally caulked portions 29a and 29b. Lead wires 40, which are used for supplying power to the circuit on the printed circuit board 22, and from which the outputs of the same circuit are obtained, are enclosed and sealed to the housing 20 by means of a rubber bushing 41.

As the rotary disk 31 rotates with the rotation of the rotary shaft 30 due to a change in the height of the car body, optical coupling is made between one of the pairs of a light-emitting diode LED and a photo transistor PHO. In other words, the beam from a light-emitting diode LED passes through a slit 31a on the rotary disk 31, while the beams from the rest of the light-emitting diodes LED are blocked by the parts of the rotary disk other than the aforementioned slit 31a, causing the corresponding photo transistor PHO to be turned on or off.

Next, an example of a detecting circuit 51, that generates position signals corresponding to the angle of rotation in the rotation angle detecting apparatus 10 mentioned above, and other signals, is described.

Figure 5:
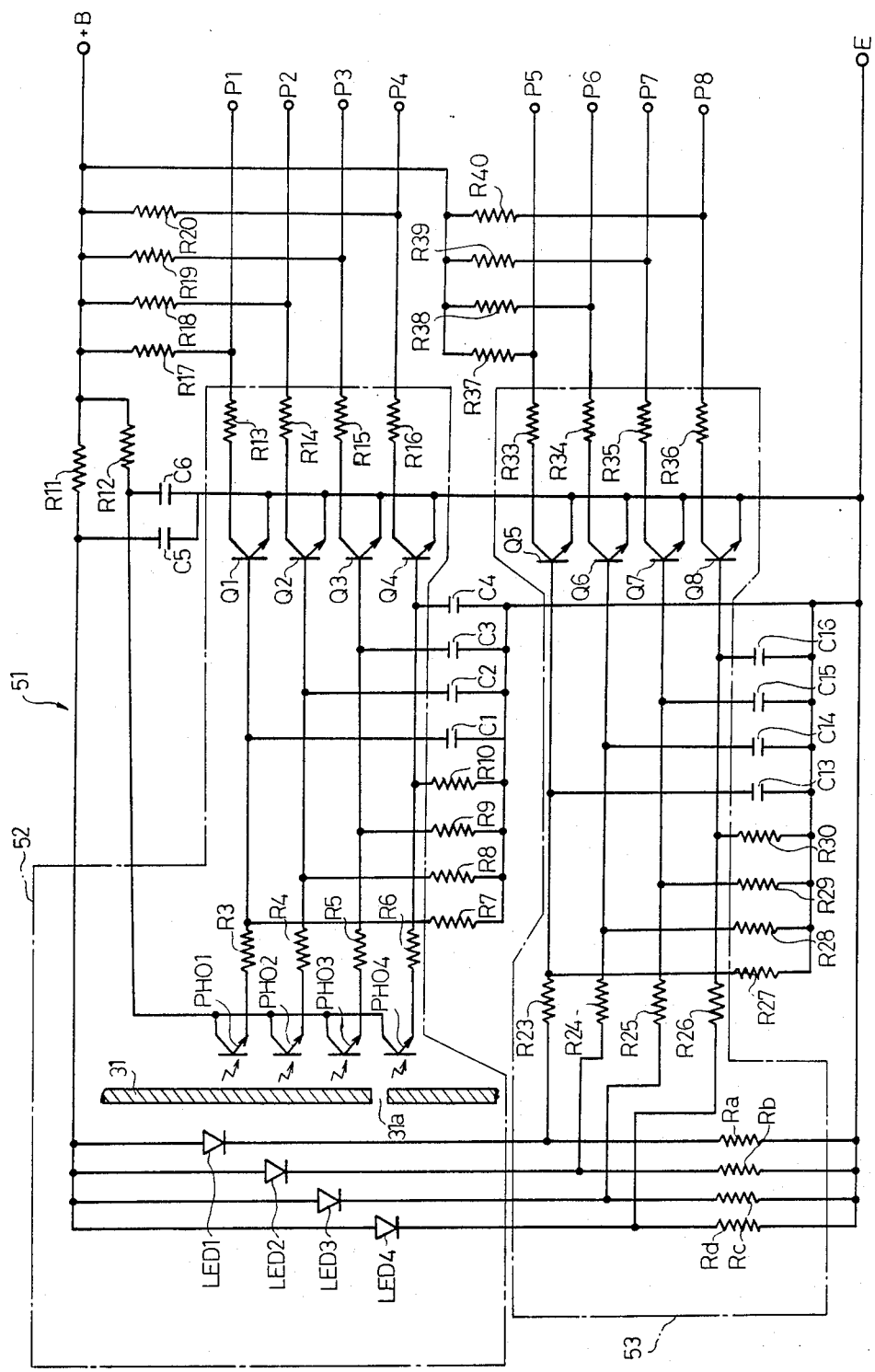
FIG. 5 is a circuit diagram showing the detecting circuit of the optical rotation angle detecting apparatus.

As shown in FIG. 5, resistors Ra, Rb, Rc, Rd, for controlling the currents, are connected in series to the 4 light-emitting diodes LED1, LED2, LED3, LED4 respectively. Power is supplied from a source to each of the light-emitting diodes LED1 to LED4 through a resistor R11 and a condenser C5, that make up a filter for absorbing the noise from the source. Likewise, power is supplied from the source to each of the 4 photo transistors PHO1, PHO2, PHO3, PHO4 arranged facing the light-emitting diodes LED1 to LED4, through a resistor R12 and a condenser C6, that make up a filter for absorbing the noise from the source.

When the photo transistor PHO1 is turned on upon receiving the light from the light-emitting diode LED1, it turns on a transistor Q1, through a resistor R3. In the same manner, when the photo transistors PHO2 to PHO4 receive the light from the light-emitting diodes LED2 to LED4 respectively, they turn on transistors Q2 to Q4 respectively, through resistors R4, R5, R6 respectively. Parallel circuits, serving as noise filters and comprising resistors R7, R8, R9, R10 and condensers C1, C2, C3, C4, respectively, are connected between the photo transistors PHO1 to PHO4 and the transistors Q1 to Q4.

The turning on of the photo transistor PHO1 indicates that the weight due to the angle of rotation of the rotary disk 31 is "1". The turning on of the photo transistor PHO2 indicates that the weight due to the angle of rotation of the rotary disk 31 is "2". The turning on of the photo transistor PHO3 indicates that the weight due to the angle of rotation of the rotary disk 31 is "4". The turning on of the photo transistor PHO4 indicates that the weight due to the angle of rotation of the rotary disk 31 is "8". Resistors R17, R13, resistors R18, R14, resistors R19, R15, and resistors R20, R16 are connected between the positive terminal B of the source and the transistors Q1 to Q4 respectively. Each of the potentials at the contact points between the resistors R17, R13, the resistors R18, R14, the resistors R19, R15, and the resistors R20, R16 is at high level "H" when the transistors Q1 to Q4 are in their turned off state, and at low level "L" when the same transistors Q1 to Q4 are turned on. The potentials mentioned above are output as a measure of the angle of rotation as detected by the rotation angle detecting apparatus 10, that is, the height of the car body is expressed in terms of a 4-bit position signal P1, P2, P3, P4. The rotary disk 31, light-emitting diodes LED1 to LED4, photo transistors PHO1 to PHO4, resistors R3 to R6, transistors Q1 to Q4, and the resistors R13 to R16 make up a total of four first detecting circuits. These four first detecting circuits make up a position-data generating circuit 52, that outputs the position data comprising the signals P1 to P4.

A transistor Q5 is connected between the light-emitting diode LED1 and the resistor Ra through a resistor R23. In the same manner, transistors Q6, Q7, Q8 are connected between the light-emitting diodes LED2, LED3, LED4 and the resistors Rb, Rc, Rd respectively through the resistors R24, R25, R26 respectively. Resistors R37, R33, resistors R38, R34, resistors R39, R35, and resistors R40, R36 are connected between the positive terminal B of the source and the transistors Q5 to Q8 respectively. Resistors R27 to R30 and condensers C13 to C16, making up noise filters, are connected between the resistors R23 to R26 and the transistors Q5 to Q8 respectively.

When the light-emitting diodes LED1 to LED4 are operating normally, a voltage is generated in the resistors Ra to Rd, and these generated voltages turn on the transistors Q5 to Q8. As a result, output signals P5 to P8, corresponding to each of the potentials at the contact points between the resistors R37, R33, the resistors R38 R34, the resistors R39, R35, and the resistors R40, R36, become low level "L". When either one of the light-emitting diodes LED1 to LED4 malfunctions due to a wire disconnection, or others, the voltage in the corresponding resistor, Ra to Rd, becomes the ground (or earth) potential, thus turning off the corresponding transistor, Q1 to Q4. Consequently, the corresponding output signal, P5 to P8, becomes high level "H".

As mentioned above, a 4-bit state signal, P5 to P8, for detecting the abnormal state of the diodes LED1 to LED4 due to wire disconnections, or others, is generated, based on the potentials at the contact points between the light-emitting diodes LED1 to LED4 and the resistors Ra to Rd. The resistors Ra and R23, transistor Q5, and the resistor R33 make up one second detecting circuit. In the same manner, the resistors Rb to Rd, R24 to R26, the transistors Q6 to Q8, and the resistors R34 to R36 make up three other second detecting circuits. These four second detecting circuits make up a state-data generating circuit 53, that outputs a state data comprising the signals P5 to P8.

Next, an example of a controlling circuit 61 in the rotation angle detecting apparatus 10, that outputs an 8-bit serial data, after transforming the position-data signals P1 to P4 and the state data P5 to P8 from the detecting circuits mentioned above, is described.

Figure 1:
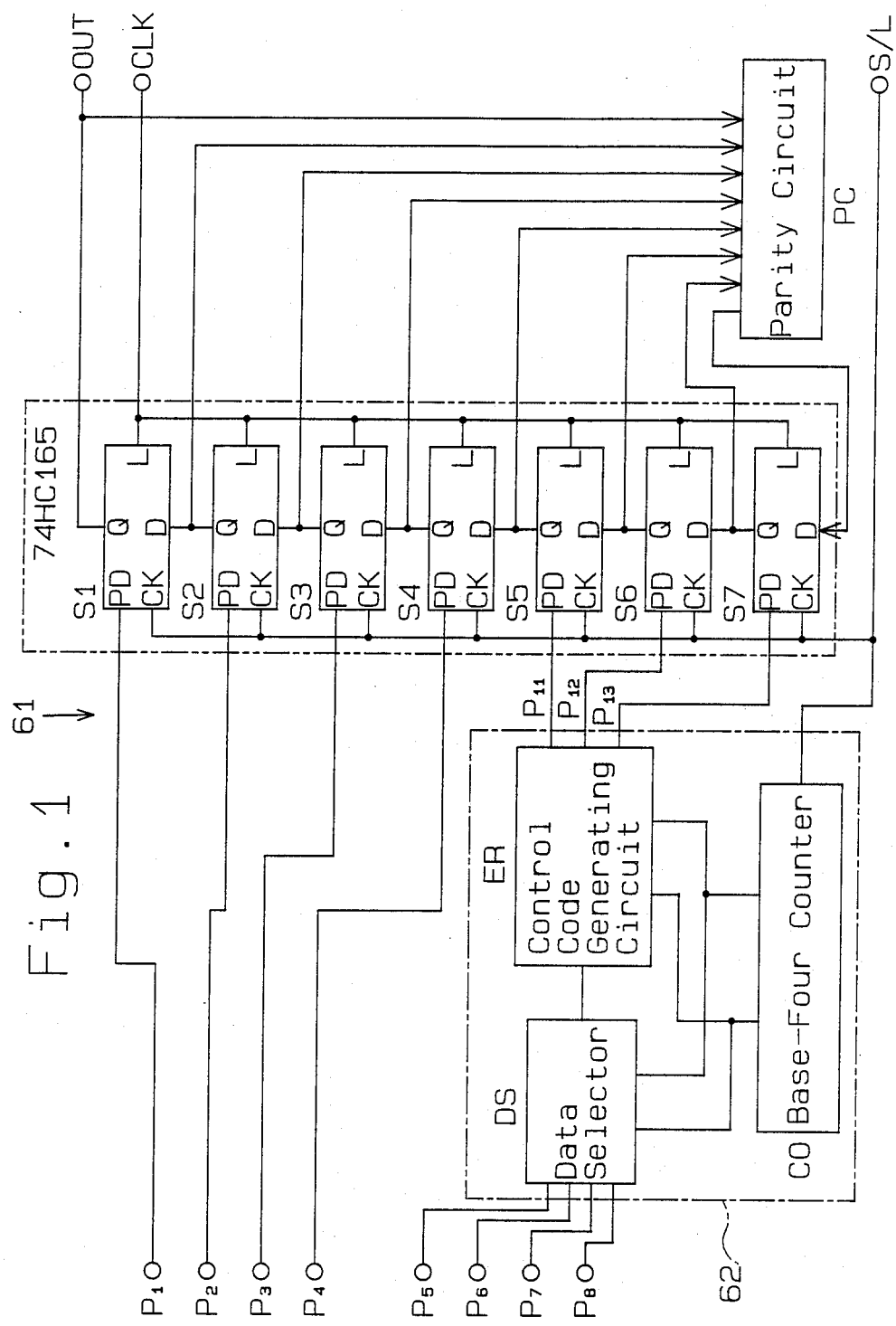
FIG. 1 is a circuit diagram showing the controlling circuit of the optical rotation angle detecting apparatus related to an embodiment of the present invention.

As shown in FIG. 1, the 4-bit position data comprising the position signals P1 to P4 are input, in the form of a gray code, to shift registers S1 to S4 of a 7-bit integrated circuit (74HC165 equivalent) comprising the shift registers S1 to S7. The state signals P5 to P8, that indicate whether there is an abnormality in the light-emitting diodes LED1 to LED4 or not, are input to a data selector DS. The data selector DS reads in the state signals P5 to P8 by consecutively scanning these same signals P5 to P8, according to a scanning signal from a base-four counter CO. Specifically, the data selector DS performs a rotational scan to detect the state of normality/abnormality of the light-emitting diodes LED1 to LED4, by taking the logical OR of the state signals P5 to P8 and the scanning signals from the base-four counter CO. The data selector DS and the base-four counter CO are widely-known elements in logical circuits, and no further explanations on these are made.

The data read in by the data selector DS is transformed to a specific control data comprising a code, with a prescribed number of bits, by a control code generating circuit ER. Letting n be the number of bits of the state data, this prescribed number of bits is obtained by calculating $\log_2(n+1)$ and rounding the result to the next higher integer. In other words, with 4 light-emitting diodes LED1 to LED4, and the number of bits n of the state data P5 to P8 being equal to 4, the number of bits of the control data is obtained by calculating $\log_2(4+1) = \log_2 5 = 2.32...$, and rounding this results to 3 bits. The scanning signals from the base-four counter CO are also input to the control code generating circuit ER. Based on these scanning signals, the control code generating circuit ER creates a 3-bit control code from the output of the data selector DS, and generates the signals P11, P12 and P13 as the control code. The data selector DS, the base-four counter CO, and the control code generating circuit ER make up a data transforming means 62, that transforms the 4-bit state signal, P5 to P8, to the 3-bit control data signal, P11 to P13. The control code generating circuit ER is a widely-known element in logical circuits, and no further explanations on it are made. Some examples of control codes that are used are shown in the following table:

| Control Code Table | | | |
|---|---|---|---|
| | Code | | |
| Normal/Abnormal | P11 | P12 | P13 |
| normal | "1" | "1" | "0" |
| LED1 abnormal | "0" | "0" | "1" |
| LED2 abnormal | "0" | "1" | "0" |
| LED3 abnormal | "0" | "1" | "1" |
| LED4 abnormal | "1" | "0" | "0" |

The 7-bit output of the shift registers S1 to S7 are input to a parity circuit PC. The parity circuit PC may be, for example, one that performs an even parity check, that is, when the total sum of the "1"s in the 7-bit output of the shift registers S1 to S7 is even, the parity circuit PC shift inputs a "0" to the shift register S7 at the first clock pulse CLK, such that the 8th bit read in during the clock pulse CLK is "0". On the other hand, when the total sum of the "1"s in the 7-bit output of the shift registers S1 to S7 is odd, the parity circuit PC shift inputs a "1" to the shift register S7 at the first clock pulse CLK, such that the 8th bit read in during the clock pulse CLK is "1". The parity circuit PC is a widely-known element in logical circuits, and no further explanations on it are made.

The operation of the optical rotation angle detecting apparatus 10 constructed in the manner described above is explained below.

When the output at a shift/load terminal S/L is low level "L", these shift registers S1 to S7 read in the position data signals P1 to P4 and the control data signals P11 to P13. On the other hand, when the output at the shift/load terminal S/L is high level "H", the data read in from the signals P1 to P4 and the signals P11 to P13 are shifted from the shift register S7 to shift registers S1 direction, according to the clock pulse CLK. The shift registers S1 to S7 create a 7-bit data, and, through the parity circuit PC, add a "0" or "1" at the last bit, then output an 8-bit serial data through the output terminal OUT.

Thus, of the 8-bit data generated by the shift registers S1 to S7, that are output through the output terminal OUT, the first four bits correspond to the position data comprising the signals P1 to P4, the next 3 bits correspond to the control data comprising the signals P11 to P13, while the last bit is the parity bit.

The repetition of the "H" and "L" output of the shift/load terminal S/L is input to the base-four counter CO, and the base-four counter CO performs a calculation according to the repetition of these "H" and "L" outputs. Then, based on the calculation result of the base-four counter CO, the data selector DS performs a scan of the state signals P5 to P8, and the control code generating circuit ER outputs the corresponding control code mentioned earlier.

Therefore, by controlling the "H" and "L" output of the shift/load terminal S/L, the 8-bit serial data can be read in, according to the clock pulse CLK, by a microcomputer (not shown), or others, in a receiving portion connected to the controlling circuit 61. Further, if codes corresponding to the control codes in the control code table shown above are stored and maintained in the receiving portion, using the 3-bit code, among the 8-bit serial code from the controlling circuit 61, that corresponds to the control code and comparing it with the stored codes, it can be determined if any of the light-emitting diodes LED1 to LED4 is functioning normally or abnormally. Further, since the last bit in the 8-bit serial data from the controlling circuit 61 is a parity bit, based on whether the total sum of the "1"s in the 8-bit data received is even or not, the receiving portion can determine whether the received data is accurate or not, that is, whether the circuits in the detecting apparatus 10, as a whole, are functioning normally or not. To summarize, the rotation angle detecting apparatus 10 of the present embodiment outputs a 4-bit serial data, that give information on the height of the car body, as well as a 4-bit serial data, that indicate whether the detecting apparatus 10 is functioning normally or not, comprising 3 bits for the control data and 1 bit for the parity check.

In addition, a set of codes not including the patterns "000" and "111" may be used for the control data, that indicate whether the light-emitting diodes LED1 to LED4 are functioning normally or not. In this way, when the code "000" is received by the receiving portion as the control data, it will indicate that the output of the rotation angle detecting apparatus 10 is zero, that is, it can be determined that the connection between the detecting apparatus 10 and the receiving portion is open. Also, when the code "111" is received by the receiving portion as the control code, it will indicate that the output of the rotation angle detecting apparatus 10 is a short circuit.

In the embodiment mentioned above, a rotation angle detecting apparatus 10, that outputs an 8-bit serial data has been described. In other words, the rotation angle detecting apparatus 10 can be constructed to output an n-bit serial data indicating the angle of rotation, and also output an n-bit serial data comprising n−1 bits for a control data and 1 bit for parity check. It must be noted, however, that the number of bits for the serial data can be increased or decreased as desired, depending on the application. For example, the rotation angle detecting apparatus 10 can output data, that indicate the state of the detecting apparatus 10, having a number of bits different from the number of bits of the position data mentioned above. Also, in the embodiment mentioned above, the data generating circuit mentioned can be removed, and the shift registers can be made into 8-bit shift registers, then input the state signals P5 to P8 as the control data to the shift registers, as is. In this way, the serial data generated will be a 9-bit data comprising a 4-bit position data, a 4-bit control data, and a parity bit.

Also, in the embodiment mentioned above, of the 8-bit serial data, the first 4 bits make up the position data and the next 3 bits make up the control data. This order may be rearranged, such that the first 3 bits make up the control data and the next 4 bits make up the position data. Further, in the present invention, switching elements like photocouplers, and others, may be used instead of the rotary disk 31, the light-emitting diodes LED and the photo transistors PHO mentioned above. Also, the present invention can be used in rotation angle detecting apparatus other than the optical rotation angle apparatus; for example, it can be applied in rotation angle sensors, in which proximity fixed switching elements, such as hole elements, lead switches, and others, are turned on or off, according to an angle of rotation. In this case, signals, that indicate an abnormal state like the disconnection of the switching elements, or others, are output by the controlling circuit 61 as the state signals.

As many apparently and widely different embodiments of this invention may be made without departing from the spirit and scope thereof, it is to be understood that the invention is not limited to the specific embodiments thereof except as defined in the appended claims.

What is claimed is:

1. A rotation angle detecting apparatus comprising:
   a rotary shaft;
   a position-data generating circuit that outputs a position data indicative of the rotational angle of the rotary shaft, the position-data generating circuit including first detecting circuits that are turned on or off according to the angle of rotation of the rotary shaft;
   a state-generating circuit that outputs a state data indicative of the states of operation of said first detecting circuits, the state-generating circuit including a second detecting circuit that detects the states of operation of said first detecting circuits; and
   a controlling circuit that transforms said position data and said state data to a serial data and outputs the serial data wherein said controlling circuit includes.
   data transforming means that transforms said state data to a control data having a prescribed number of bits, and wherein n defines the number of state data bits, said prescribed number of bits of said control data being determined by rounding to the next higher integer the result of $\log_2(n+1)$, and
   a parity circuit that performs a parity check on a data comprising said position data and said state data, and
   wherein said serial data comprises said position data, said state data, and a parity bit.

2. A rotation angle detecting apparatus, as set forth in claim 1, in which said data transforming means comprises a data selector, to which said state data is input, a control code generating circuit, which said state data is input, a control code generating circuit, that outputs said control data in response to the data output from said data selector, and a counter, that inputs a scanning signal to said data selector and said control code generating circuit.

3. A rotation angle detecting apparatus, as set forth in claim 1, in which said controlling circuit further includes shift registers, that output said serial data, based on said position data, said control data, and said parity bit datum.

4. A rotation angle detecting apparatus comprising:
   a rotary shaft;
   a position-data generating circuit that outputs a position data indicative of the rotational angle of the rotary shaft, the position-data generating circuit including first detecting circuits that are turned on or off according to the angle of rotation of the rotary shaft;
   a state-generating circuit that outputs a state data indicative of the states of operation of said first detecting circuits, the state-generating circuit including second detecting circuits that detect the states of operation of said first detecting circuits; and
   a controlling circuit that transforms said position data and said state data to a serial data and outputs the serial data; and
   wherein said second detecting circuits have resistors connected in series with said first detecting circuits, and said state-data generating circuit outputs said state data according to the voltages generated in said resistors.

5. A rotation angle detecting apparatus comprising:
a rotary shaft;
a position-data generating circuit that outputs a position data indicative of the rotational angle of the rotary shaft, the position-data generating circuit including first detecting circuits that are turned on or off according to the angle of rotation of the rotary shaft;
a state-generating circuit that outputs a state data indicative of the states of operation of said first detecting circuits, the state-generating circuit including second detecting circuits that detect the states of operation of said first detecting circuits; and
a controlling circuit that transforms said position data and said state data to a serial data and outputs the serial data; and
wherein said first detecting circuits have a light-emitting element and a light-receiving element that undergo optical coupling; and
wherein said second detecting circuits have resistors connected in series with said light-emitting elements, and said state-data generating circuit outputs said state data according to the voltages generated in said resistors.

6. A car-body height detecting apparatus comprising:
a position-data generating circuit that outputs a position data indicative of the height of the car body, and includes first detecting circuits that are turned on or off according to the height of the car body;
a state-generating circuit that outputs a state data indicating the states of operation of said first detecting circuits, the state-generating circuit including second detecting circuits that detect the states of operation of said first detecting circuits; and
a controlling circuit that transforms said position data and said state data to a serial data and outputs the serial data; and
wherein said second detecting circuits have resistors connected in series with said first detecting circuits, and wherein said state-data generating circuit outputs said state data according to the voltages generated in said resistors.

7. An optical rotation angle detecting apparatus comprising
a rotary shaft,
a rotary disk, that has slits and is mounted to said rotary shaft such that they are integrally rotatable,
n pairs of a light-emitting element and a light-receiving element provided on both sides of said rotary disk in the direction of its thickness, with a prescribed pair of a light-emitting element and a light-receiving element among said light-emitting elements and light-receiving elements undergoing optical coupling according to the angle of rotation of said rotary shaft, said light-receiving elements outputting a first data comprising an n-bit voltage signal,
a data generating circuit having resistors electrically connected in series with said light-emitting elements, said data generating circuit outputting a second data, comprising an n-bit second voltage signal, based on the voltages generated in said resistors, and
a controlling circuit, that outputs a 2n-bit serial data based on said first data and second data.

8. A rotation angle detecting apparatus, as set forth in claim 7, in which said controlling circuit includes a data transforming means, that transforms said n-bit second data to a control data having a prescribed number of bits, and a parity circuit, that performs a parity check on a (2n−1)-bit data comprising said first data and said control data, and in which said 2n-bit serial data comprises said n-bit first data, said control data having a prescribed number of bits, and a parity bit, said prescribed number of bits of said control data being by rounding to the next higher integer the result of $\log_2(n+1)$.

* * * * *